(12) United States Patent
Huang et al.

(10) Patent No.: US 11,793,164 B1
(45) Date of Patent: Oct. 24, 2023

(54) REUSABLE EAR TAG

(71) Applicant: Movella Inc., San Jose, CA (US)

(72) Inventors: Cheng Pin Huang, San Jose, CA (US);
Yu-Chia Chang, San Jose, CA (US);
Cheng Lucky, San Jose, CA (US)

(73) Assignee: Movella Inc., Henderson, NV (US)

( * ) Notice: Subject to any disclaimer, the term of this patent is extended or adjusted under 35 U.S.C. 154(b) by 0 days.

(21) Appl. No.: 17/552,205

(22) Filed: Dec. 15, 2021

(51) Int. Cl.
*A01K 11/00* (2006.01)
*A01K 29/00* (2006.01)

(52) U.S. Cl.
CPC .......... *A01K 11/004* (2013.01); *A01K 11/006* (2013.01); *A01K 29/005* (2013.01)

(58) Field of Classification Search
CPC .. A01K 11/004; A01K 11/006; A01K 11/005; A01K 11/00; A01K 11/001
USPC ........................................................ 24/703.5
See application file for complete search history.

(56) References Cited

U.S. PATENT DOCUMENTS

| | | | | |
|---|---|---|---|---|
| 620,712 A | * | 3/1899 | Keil .................. | B68G 7/08 24/94 |
| 3,425,487 A | * | 2/1969 | Tucker ............... | A41D 13/005 36/2.6 |
| 9,848,577 B1 | * | 12/2017 | Brandao ............ | A01K 11/004 |
| 2010/0325926 A1 | * | 12/2010 | Hilpert ................ | A01K 11/001 40/300 |
| 2019/0350168 A1 | * | 11/2019 | Shi ..................... | A01K 29/005 |
| 2020/0405233 A1 | * | 12/2020 | Sakkalis ............ | G04G 21/025 |

FOREIGN PATENT DOCUMENTS

CN 112970616 A * 6/2021

* cited by examiner

*Primary Examiner* — Joshua D Huson
*Assistant Examiner* — Spencer T Callaway
(74) *Attorney, Agent, or Firm* — Richard T. Ogawa; Ogawa P.C.

(57) ABSTRACT

A monitoring device includes a male portion including a housing with a top on a first ear side, a first needle and a shorter second needle for piercing the ear, electronic components including a battery, processor and temperature sensor, a thermally conductive ring on the first ear side coupled to the temperature sensor, a female portion including a housing with a bottom surface on a second ear side, a first and second openings in the housing, a first chamber for physically selectively retaining and releasing the first needle, and a second chamber for inhibiting rotation of the male portion relative to the female portion, when the first needle is physically retained by the first chamber.

20 Claims, 4 Drawing Sheets

REUSABLE EAR TAG

BACKGROUND OF THE INVENTION

The present invention relates generally to apparatus for monitoring of animal health. More specifically, the present invention relates to devices capable of short-term monitoring of animals, such as livestock. Embodiments are reusable and have reduced discomfort.

Maintaining the health of animals is a major concern in the livestock industry. Previous studies have described the negative effects of external factors upon the health of animals. For example, high environmental temperature and humidity are often associated with a higher risk of disease, dehydration, weight loss, changes in behavior, reduction in food consumption, changes in blood indicators, and the like, in animals. As each animal is subject to different environmental conditions, the remote monitoring of each animal is desired.

Various systems that have been previously used to monitor animal welfare have included devices that are attached are to the outside of an animal (e.g. a collar or an ear tag) and devices that are inserted inside of an animal (e.g. subcutaneously). These devices are used to capture images, sounds, sensor data, weight and body condition, and biological metrics of the livestock. The collected data may be processed by the device or by a remote base station, and the farmer may be notified if an animal is in distress. Such devices are typically robust, heavy-duty devices as they are designed to be attached to the animal for long periods of time. e.g. months and years.

The inventors of the present invention recognize that the use of such long-term monitoring devices are often not appropriate for all desired animal-tracking applications. More specifically, in some specific application desired by the inventors, there is a need to unobtrusively obtain consistent and accurate data, e.g. animal temperature readings, over short periods of time, e.g. hours and days. Such situations may include for short-term activities, such as transport duration and distance, feeding and watering, rest and activity intervals and the like.

Drawbacks to using long-term ear tags for short-term applications include that the long-term tags often have large diameter metal or plastic pegs that pierce the animal so they can be reliably affixed to the animal for a long time. Such damage to the animal for repeated short-term applications are believed by the inventors to be undesirable as they would greatly damage the portion of the animal (e.g. its ears) and lead to open wounds and infections. Further, because the long-term tags typically have large batteries to monitor the animal over long periods of time, the long-terms tags may weaken or rip the ears of the animals. Still further, the cost of such long-term tags for short term use can be expensive for the farmer.

In light of the above, what is desired are improved animal tracking tags without the drawbacks described above.

BRIEF SUMMARY OF THE INVENTION

Embodiments of the present invention disclose an electronic animal tracker design that is less invasive, is rugged, is more reliable, and provides higher consistency readings. Some of the disclosed embodiments provide an improved ear tag having a male stud and a female stud, that provides a secure and stable fit upon an animal's ear, or the like. In some embodiments, the device may include an ear tag having multiple thin protrusions (e.g. stainless steel needles) that are used to pierce the animal's ear. Because they are thin, the protrusions cause smaller wounds to the ear. Additionally, in some embodiments, by including a tool-free enclosure, replaceable batteries may be used. Because these batteries are lighter-weight, the ear tag may cause less discomfort to the animal.

In some embodiments, a new ear tag may include a housing design including carbon fiber material or other lightweight material. A male portion may include electronics (e.g. temperature sensor, battery, etc.) and thin protrusions (e.g. needles) to penetrate the animal's ear. The male portion may include a thermally conductive region (sometimes in a ring-type shape) that is pressed against the animal's ear and that thermally conducts heat from the ear to the temperature sensor.

The ear tag may also include a female portion may include one or more retention portions, e.g. indentations, that receive the protrusions and constrain the movement of the male portion away from the female portion. In various embodiments, at least one of the protrusions may include a lip or other retention structure. This structure can then be engaged within a lock/release mechanism in at least one of the indentations to constrain the male and female portions. In some embodiments, only one such lock/release may be used for one protrusion. In this case the one protrusion may be longer than the other protrusions. Various lock/release mechanisms may be used as illustrated below.

According to one aspect, a biometric monitoring device for an ear of an animal is disclosed. One device may include a male portion configured to be disposed on a first side of the ear. A device may include a first housing having an upper surface configured to be disposed towards the first side of the ear, and a plurality of protrusions disposed upon the upper surface of the first housing, wherein upper portions of the plurality of protrusions are configured to be disposed through the ear from the first side of the ear to a second side of the ear, wherein the plurality of protrusions includes at least a first protrusion and a second protrusion, wherein the first protrusion is longer than the second protrusion. Another device may include a plurality of electronic components disposed within the first housing, including a battery, a processor, and a temperature sensor, and a thermally conductive ring disposed upon on the upper surface of the first housing, wherein the ring is configured to be disposed against the first side of the ear and wherein the thermally conductive ring is thermally coupled to the temperature sensor. An apparatus may include a female portion configured to be disposed on the second side of the ear and coupled to the male portion comprising. The apparatus may include a second housing having a lower surface configured to be disposed against the second side of the ear, and a plurality of internal openings in the lower surface of the second housing, wherein the internal openings are configured to receive the upper portions of the plurality of protrusions, wherein the internal openings comprise at least a first opening and a second opening. Another apparatus may include a retention portion disposed within the second housing, wherein the retention portion is configured to releasably retain an upper portion of the first protrusion when the first protrusion is disposed through the first opening, wherein the male portion is secured relatively to the female portion when the retention portion retains the upper portion of the first protrusion, and a chamber portion disposed with the second housing, wherein the chamber portion is configured to receive an upper portion of the second protrusion when the upper portion of the second protrusion is disposed through the second opening, wherein the chamber portion is configured to inhibit the female portion from being rotated relative to the male portion when the upper portion of the second protrusion is disposed through the second opening.

According to another aspect, a monitoring device for an ear of an animal is disclosed. One device may include a first portion configured to be disposed on a first side of the ear of the animal. A device may include a first housing having an upper surface configured to be disposed towards the first side of the ear, and a first protrusion extending through the upper surface comprising a first upper portion configured to be disposed through the ear from the first side to a second side of the ear, wherein the first protrusion has a first maximum thickness within a range of 1 to 2 mm, or greater. Another device may include a second protrusion extending through the upper surface comprising a second upper portion configured to be disposed through the ear from the first side to the second side, wherein the second protrusion is characterized by a second maximum thickness less than the first maximum thickness. In some examples, the first and second protrusions may have a thickness with a range of 0.25 mm to 3 mm. An apparatus may include a second portion configured to be disposed on the second side of the ear and configured to removably coupled to the first portion through the ear. An apparatus may include a second housing comprising a bottom surface configured to be disposed towards the second side of the ear, wherein the second housing comprises a first internal opening configured to receive the first upper portion of the first protrusion, and a second internal opening configured to receive the second upper portion of the second protrusion, and a plurality of electronic components disposed within the second housing, including a battery, a processor, and a temperature sensor. Another apparatus may include a thermally conductive ring disposed on the bottom surface of the second housing, wherein the thermally conductive ring is configured to be disposed against the second side of the ear, wherein the thermally conductive ring is thermally coupled to the temperature sensor, and a retention portion disposed within the second portion, wherein the retention portion is configured to retain the first upper portion of the first protrusion. An apparatus may include the second internal opening is configured to inhibit the first housing to be rotated relative to the second portion when the second upper portion of the second protrusion is disposed with the second internal opening, and the second housing comprises a first portion including the upper surface and a second portion. Another apparatus may include the first portion and the second portion are configured to be disposed within an open physical configuration and a closed physical configuration, when the first portion and the second portion are disposed within the open physical configuration, the battery is physically accessible, and when the first portion and the second portion are disposed within the closed physical configuration, the battery is physically inaccessible.

BRIEF DESCRIPTION OF THE DRAWINGS

FIGS. 4A-B illustrate additional embodiments of a male portion of a monitoring tag;

FIGS. 5A-B illustrate additional embodiments of a male portion of a monitoring tag;

DETAILED DESCRIPTION

Embodiments of the present invention are directed towards short-term animal monitoring tags. Embodiments reduce or alleviate the animals' pain during piercing, and reduce the size of piercing wounds to reduce the infection potential. With embodiments of the new design, ear tag needles are used so that the puncture wound-size is much smaller than commonly used long-term monitoring tags. In some examples, to prevent rusty or deformation over time, the needles are molded in one piece from stainless steel, or the like.

In some embodiments, a male portion of the monitoring tag is disclosed having needle-like protrusions extending therefrom. In some examples, the needle-like protrusions may include one or more retention needles and one or more support needles. As illustrated below, typically the needles extend upwards from an upper surface of the male portion.

In various embodiments, a retention needle may include one or more retaining structures, such as a semicircular indent, a notch, a cap, or the like. The retaining structure on a retention needle is physically retained by a female portion of the monitoring tag, as illustrated below. In some examples, the one or more remaining of needles are support pillars that strengthen the attachment of the ear tag to the animals' ears. For example, these additional needles reduce the tendency of the animals' ears from bending and reduce the cutting force imposed on the ears, as discussed below.

In various embodiments, the inventors have determined that if the weight of the ear tag is heavy, i.e., over 25 grams, the protrusions (e.g. needles) may act like a knife and rip or cut the animals' ears. For example, when the animals snag their ear tags against a wall or when the animals shake their heads, the inventors have noted that the protrusions may cause length-wise cuts to the ear. Such injuries greatly increase the risks of infections. To address such tendencies, in some embodiments, multiple retention protrusions (e.g. needles) are used to reduce the sheer force observed for any individual protrusion. Additionally, in some embodiments, the short-term tag is kept light weight, by decreasing the battery size and also by allowing replacement of the batteries.

Figure 1:
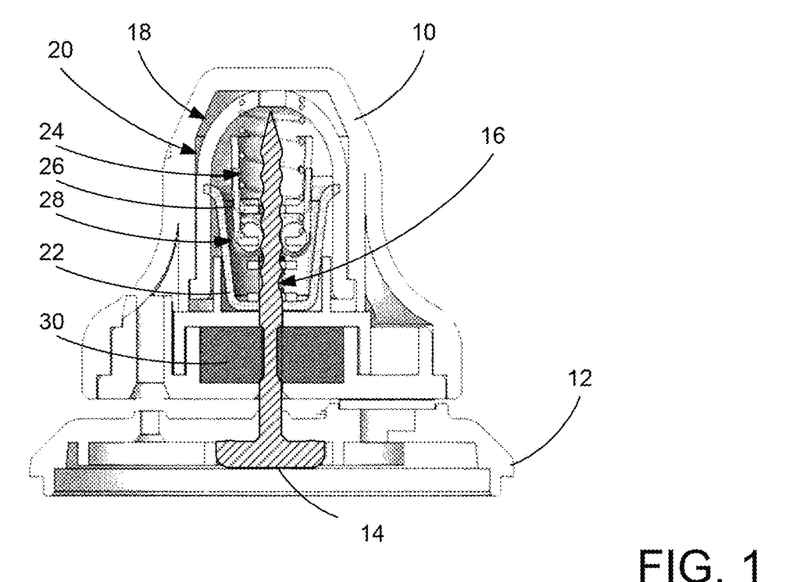
FIG. 1 illustrates a cross-section of a monitoring tag according to some embodiments.

FIG. 1 illustrates a cross-section view of some embodiments of the present invention. In this example, a top structure is a female portion 10, and the lower disk-shaped portion is a male portion 12. As can be seen, male portion 12 includes at least one retention protrusion (e.g. needle) 14 extending upwards including a number of retention structures (e.g. threads or indents) 16.

In various embodiemnts, female portion 10 includes a cavity 18 with a retention portion/mechanism 20 configured to receive retention needle 14 from male portion 102 and configured to selectively retain and release retention needle 14. In one embodiment, retention mechasism 20 may include chamber 22 with a spring 24, a metal (e.g. magnetic) cup element 26, and a number of metal (e.g. steel) balls 28. In other embodiments, other types of retention mechanisms may be included. A rubber gasket 30 may also be provided to reduce the intrusion of humidity or water into cavity 18.

Figure 2:
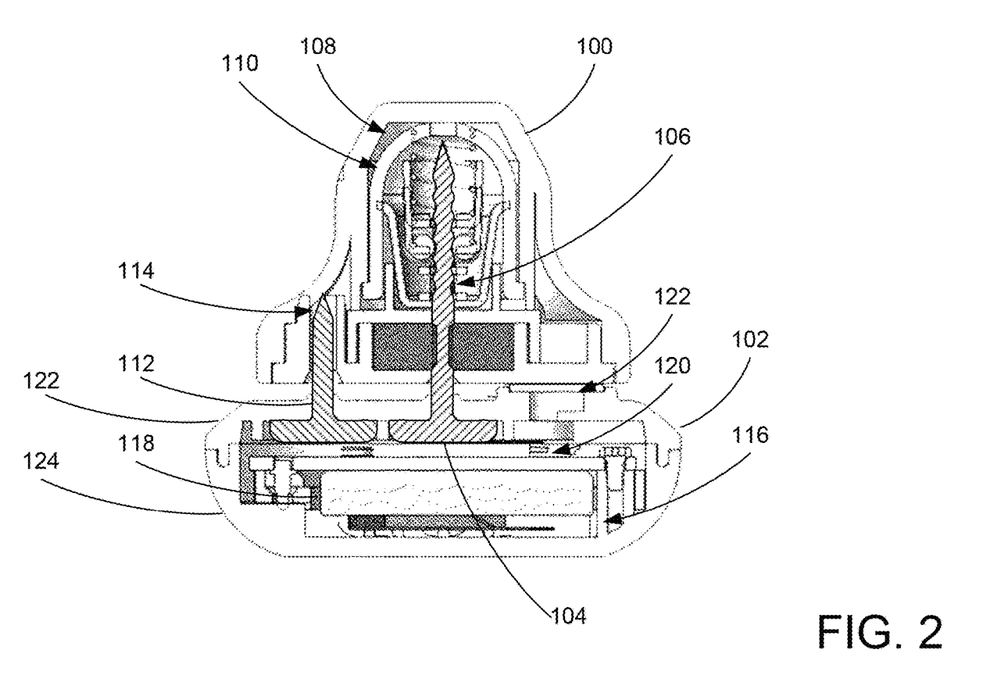
FIG. 2 illustrates a cross-section of a monitoring tag according to additional embodiments.

FIG. 2 illustrates another cross-section view of another embodiment. In this cross-section, a female portion 100 and a male portion 102 are illustrated. Similar to the embodiment in FIG. 1, portion 102 may include a retention needle 104 including retention structures 106. Female portion may include a cavity 108 including a retention mechanism 110.

As illustrated in the embodiment in FIG. 2, a support protrusion (or needle) 112 is illustrated between male portion 102 and female portion 100. In some embodiments, support protrusion 112 may be affixed to male portion 102 along with retention protrusion 104 and be directed towards female portion 100. In FIG. 2, female portion 100 is illustrated including a receiving portion 114 receiving support protrusion 112. In other embodiments, retention protrusion 104 may be affixed to male portion 102 and be directed upwards towards female portion 100 and support protrusion 112 may be affixed to female portion 100 and be directed towards male portion 102. In such embodiments, male portion 102 may include a receiving portion.

In various embodiments, multiple support protrusions may be included in addition to the retention protrusion 104. Having multiple protrusions (retention and support) help spread the potential shear force of male portion 102 relative to female portion 100 over a wider amount of the ear of the animal. Such embodiments weaken the potential cutting force of a single protrusion among the needles when subject to a shear force. For instance, when using a single retention protrusion, since it bears all of the stress of a shear force, the protrusion may act as a knife on the ear or skin. Accordingly when the animal rubs its ears against an object, or even when the animal shakes its head, the protrusion may slice through the ear of the animal. In contrast, with embodiments having a retention protrusion and one or more support protrusions, a sheer force applied between the male portion and the female portion will be distributed between the retention protrusion and the support protrusions. Accordingly, the likelihood for the protrusion to rip through the animal's ear is reduced.

FIG. 2 also illustrates additional features of the present embodiment. More specifically, male portion 102 is illustrated including a cavity 116 including electronic components such as a battery 118, a temperature sensor 120, and a thermally conductive structure 122. In some embodiments, additional electronic components may include one or more of the following: a microcontroller, an accelerometer, a gyroscope, a magnetometer, a pressure sensor, a GPU unit, a short-range communications (UWB, Wi-Fi, Bluetooth, NFC) hardware, or the like.

In various embodiments, cavity 116 may be opened for replacement of battery 118, or the like. As illustrated in FIG. 2, male portion 102 may include an upper portion 122 and a lower portion 124 that can be interlocked to each other, and can be separated from each other. In some embodiments, upper portion 122 and lower portion 124 may be screwed tightly with respect to each other, can be snapped tightly with respect to each other, or the like, to form cavity 116 that is protected from water, dust or dirt, and the elements.

In some embodiments, the operation of a retention mechanism is described below referring to FIG. 1 for sake of convenience. In operation, spring 24 creates a downward force between a upper portion of retention mechanism 20 and cup element 26. In turn, the bottom portion of cup element 26 pushes metal balls 28 downwards towards chamber 22. Metal balls 28 are then forced between protrusion 14 and the side walls or bottom of chamber 22. In various embodiments, when metal balls 28 are pushed against the protrusion, metal balls 28 will settle into a retention structure 16 of the protrusion or needle 14. In such a configuration, male portion 12 becomes limited in movement with respect to female portion 10, i.e. in some cases, male portion 12 becomes locked to female portion 10.

In various embodiments, to remove male portion 12 from female portion 10, a magnetic field is applied to female portion 10. The magnetic field attracts cup element 26, and cup element 26 overcomes the bias provided by spring 24 and moves upwards. This reduces the force of metal balls 28 against the side or bottom of chamber 22 and against retention structure 16. Next, a force may be applied relative to male portion 12 and female portion 10, because metal balls 28 are no longer locked within retention structure, protrusion 14 can be removed out of retention mechanism 20.

Figure 3A:
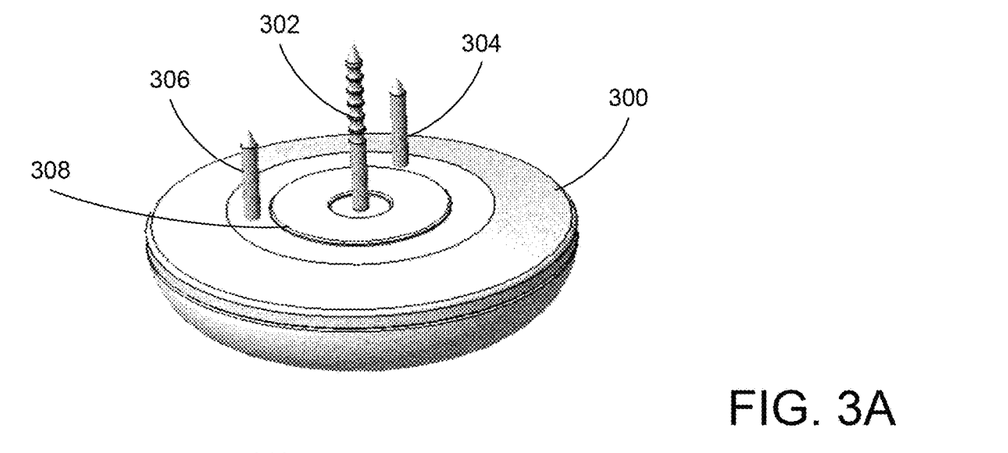
FIGS. 3A-B illustrate embodiments of a male portion of a monitoring tag.

FIGS. 3A-B illustrate additional embodiments. More specifically, FIG. 3A illustrates an embodiment of a male portion 300 including a retention protrusion 302, two support protrusions 304 and 306, and a thermally conductive structure (e.g. ring) 308. In various embodiments, the heights and thicknesses (e.g. diameters) of protrusion 302, 304 and 306 may vary and all be different. Additionally, the angles formed by protrusion 304, 302 and 308 may vary, e.g. they may be colinear (e.g. form a 180 degree angle), and they may form an obtuse or acute angle.

Figure 3B:
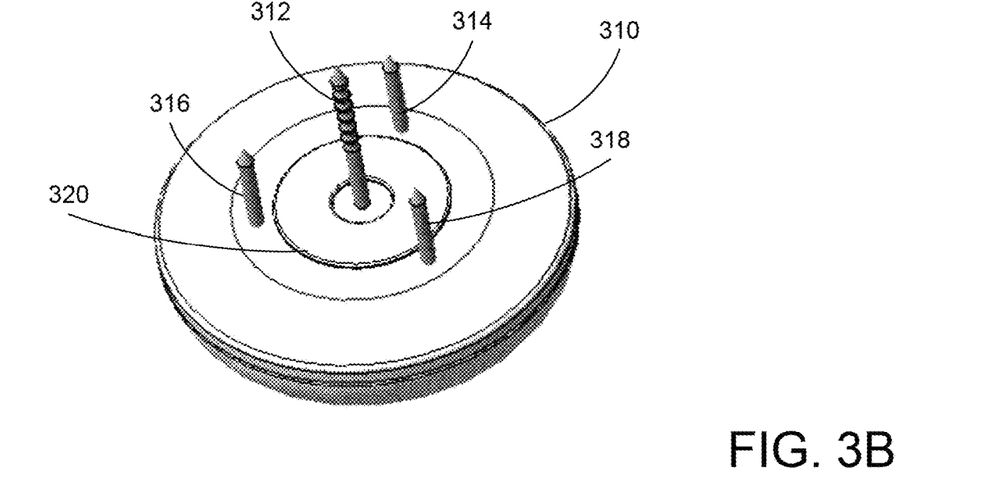

FIG. 3B illustrates an embodiment of a male portion 310 including a retention protrusion 312, three support protrusions 314, 316 and 318, and a thermally conductive structure (e.g. ring) 320. In various embodiments, again, the heights and thicknesses (e.g. diameters) of protrusion 312, 314, 316 and 318 may vary and all be different. Additionally, the distribution of protrusion 314, 316 and 318 around the illustrated may be uniform, e.g. they may be 120 degrees apart, or they may be irregular (e.g. they form a non-isosceles triangle).

Figure 4A:
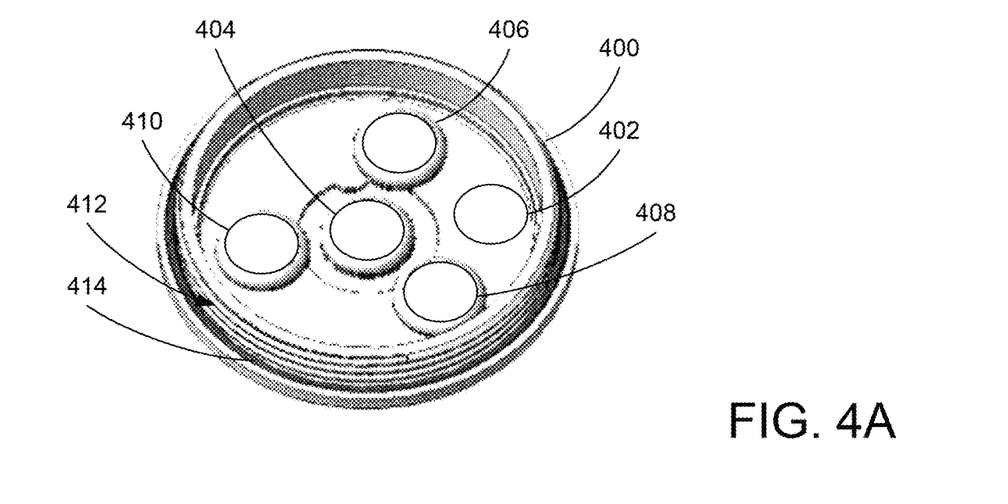

FIGS. 4A-B illustrates embodiments of a male portion. In particular, FIG. 4A may be a underside view of male portion 310 in FIG. 3B. In various embodiments, as was discussed in FIG. 2, it is contemplated that male portion may be formed from an upper portion 122 and a lower portion 124 that together form a cavity for electrical components. FIG. 4A illustrates an underside view of an upper portion 400 of male portion including flanges 404, 406, 408 and 410 for protrusions 312, 318, 314, and 316, respectively. A contact 402 is also illustrated that is thermally coupled to ring 320 (FIG. 3B).

Additionally, as shown, upper portion 400 may include a screw thread 412 or other physical structure that can engage a lower portion (shown below) of a male portion. In some embodiments, a flexible gasket (e.g. silicone, rubber, or the like) 414 may be provided to increase resistance to dirt or water contamination into the cavity.

FIG. 4B illustrates a top view of a lower portion of a male portion. More specifically, a housing for lower portion 416 is shown including a printed circuit board (PCB) 418 including electronic components, described herein, e.g. a battery 420, a temperature sensor 424, and the like. In various embodiments, when the upper portion and lower portion of male portion are secured, it is contemplated that temperature sensor 424 will be in thermal contact with contact 402 (FIG. 4A).

In some embodiments, lower portion 416 and upper portion 400 may be screwed together using threads 422 and 412. In other embodiments, upper and lower portion may be snapped together, and the like.

FIGS. 5A-B illustrate another embodiment of the present invention. More specifically, FIGS. 5A-B illustrate another embodiment of a lower portion 500 of a male portion. In FIG. 5B, a cap 502 is illustrated attached to lower portion 500, and in FIG. 5A, cap 502 is removed. In various embodiments, it is contemplated that cap 502 can be removed from lower portion 500 so that battery 504 can be replaced by an end user, and that cap 502 can be snapped on or screwed into lower portion 500 so lower portion 500 will be water resistant or water-tight.

Figure 6A:
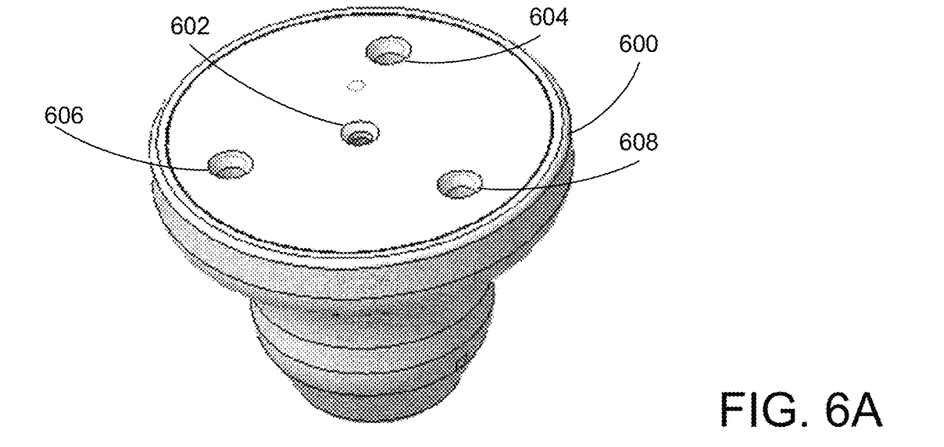
FIGS. 6A-B illustrate some embodiments of a female portion of a monitoring tag.

FIGS. 6A-B illustrate various embodiments. More specifically FIG. 6A illustrate a female portion 600 having a number of openings 602, 604, 606 and 608. In various embodiments, the number of openings may vary and the radial and angular spacing of the openings may vary according to the specific arrangement of protrusions on the male portion. Additionally, in some embodiments, female portion 600 may include protrusions that are received in openings of the male portion.

Figure 6B:
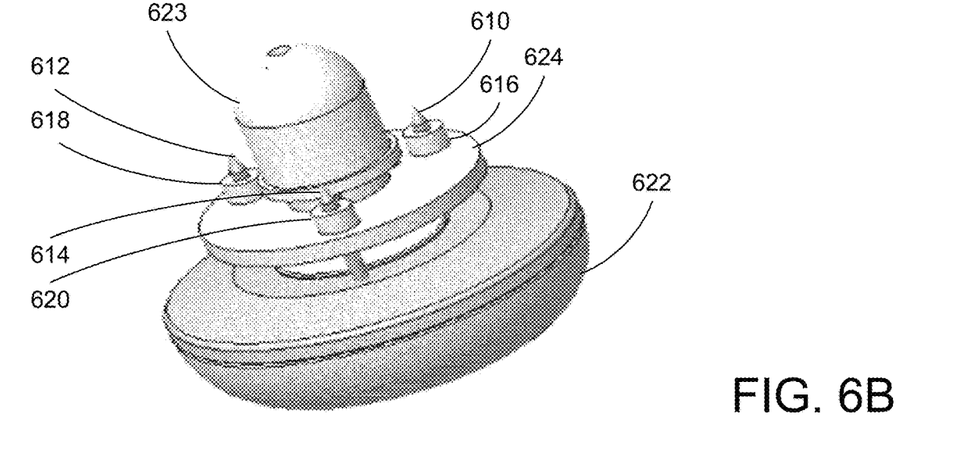

As illustrated in FIG. 6B, internally inside female portion 624, support protrusions 610, 612 and 614 are disposed from a male portion 622 within receiving portions 616, 618 and 620. As discussed above, receiving portions are configured to receive the support protrusions and to inhibit the male portion from twisting relative to the female portion. FIG. 6B also illustrates a retaining mechanism 623 into which a protrusion from the male portion is retained therein.

Figure 7:
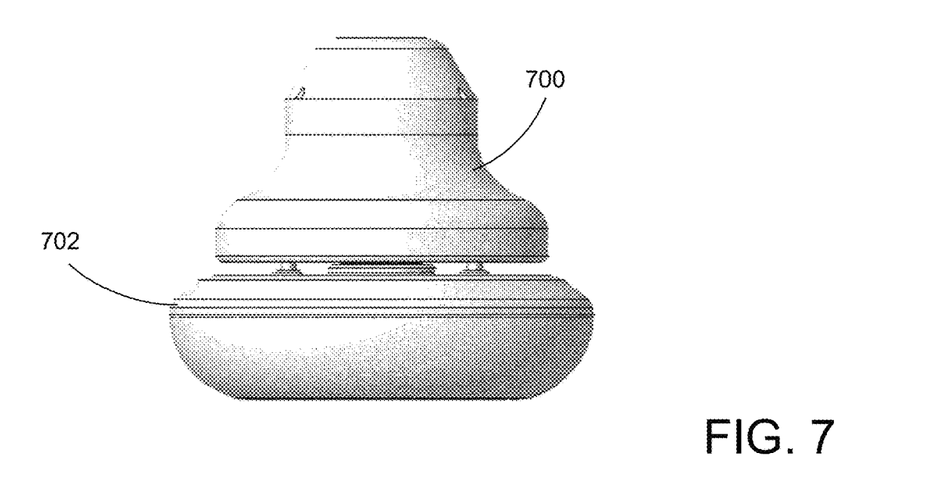
FIG. 7 illustrate various embodiments of a monitoring tag.

FIG. 7 illustrates another embodiment. In this figure, an assembled ear tag is illustrated including a female portion 700 and male portion 702. In other embodiments, other shapes for male and female portion are contemplated.

Figure 8:
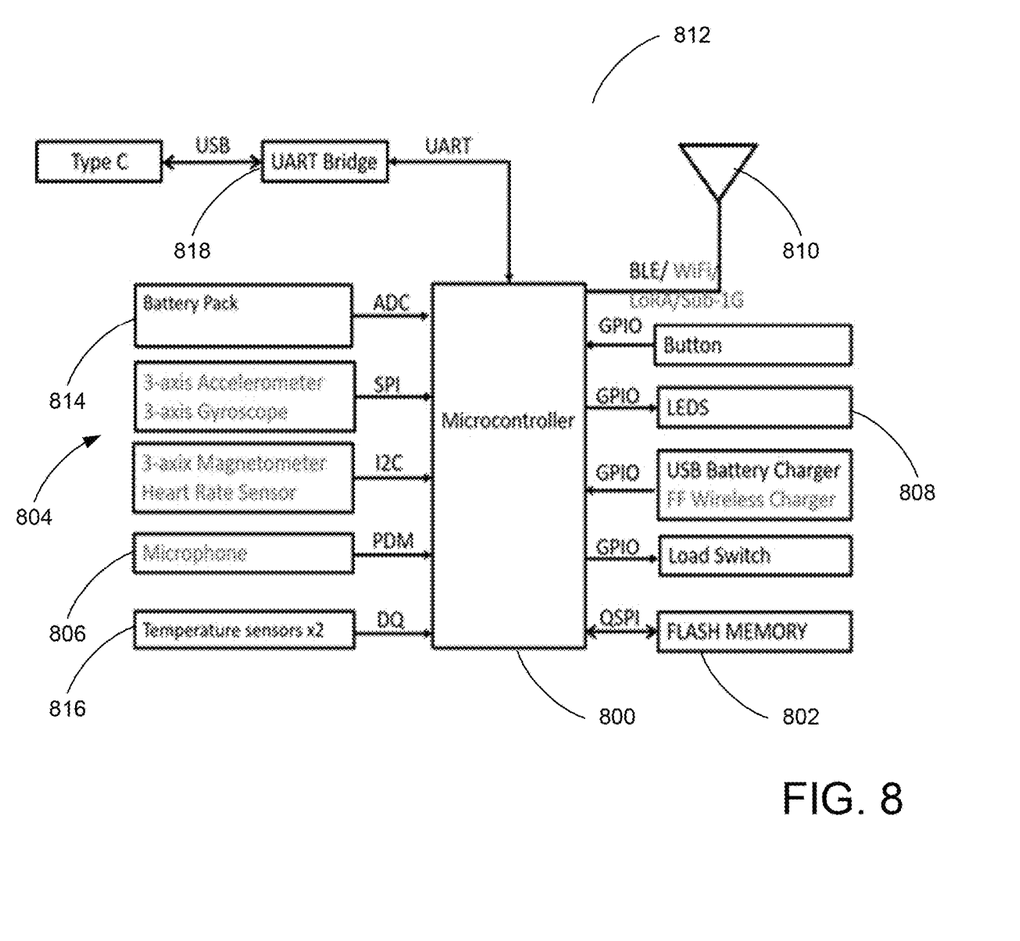
FIG. 8 illustrates a functional block diagram according to various embodiments.

FIG. 8 illustrates a block diagram of a monitoring. More specifically, FIG. 8 illustrates a block diagram of various embodiments of an electrical devices that may be incorporated into a male portion or a female portion of an ear tag, or the like.

In some embodiments, a typical device 812 may include a processor or microcontroller 800, a memory 802, physical perturbation sensors (e.g. accelerometer, gyroscope, pressure sensor) 804, audio/video sensors 806, sensory output devices 808 (e.g. lights, speakers), short-range transceivers 810 (Bluetooth, ultrawide band (UWB), near field communication (NFC)), biosensors (e.g. heart rate), an internal power supply 814, temperature sensors 816, a wired interface 818, and the like.

In some configurations, the processor 800 may be an ARM Cortex processor with Bluetooth LE RF, although other low-power processors may also be used. As illustrated above, microcontroller 800 may include numerous functionality such as a transceiver, temperature sensors, serial communications functionality (e.g. UART), comparators, and the like. In some embodiments, a superset or subset of the hardware and software functionality described herein may be used.

In various embodiments, data processing algorithms may be included in the flash memory. Examples of algorithms may include: gait analysis, heart rate variability, energy exertion, respiration rate, sound classification, direction or heading determination, steps, joint angle and the like. By having such algorithms being performed on the monitoring device, the amount of data output by the monitoring device to an external computing system can be greatly decreased.

Further embodiments can be envisioned to one of ordinary skill in the art after reading this disclosure. For example, in some embodiments, these biometric monitoring devices may be affixed to one or more animals within a herd, flock, or the like. Data regarding each of the monitored animals may then be wireless provided to a local transceiver using Bluetooth, RF, or the like, as described above. The local transceiver then uploads the animal data to a monitoring service (e.g. a physical or virtual server) that processes the animal data. Using artificial intelligence, e.g. machine learning algorithms, the monitoring service may then monitor each individual animal based upon its own specific physiology, monitor the weather conditions, and determine whether the individual health status of the individual animal. Alternative or additionally, the individual data from the group of animals may be processed, also using AI techniques, to determine health of the entire group. In response to the health data, the monitoring service may determine a list of actions the farmer is required/desired to do for the individual animal or the group. For example, if an individual animal is running a temperature while other animals are not, the individual may be flagged as unwell. The farmer may also be instructed to separate the individual animal from the group and have a veterinarian look over the animal. As additional examples, if all animals in a group are running a temperature and the monitoring service determines that there is a heat wave (processing weather data), the farmer may be instructed to bring the animals into a covered or shaded location, give the animals more water, provide a mister, not to transport the animals or the like. Further, in this example, if the monitoring service determines that there is no heat wave, the animals may all be sick, and the monitoring service may instruct the farmer to consult a veterinarian. In other embodiments, the monitoring service may also receive and process other types of data to help determine the health of animals, such as the amount of movement of the animal, the amount of sleep, the type of feed provided, the feeding times, the amount of feed per head provided, the other types of animals on the farm, the amount of space per animal, the types of medications used, the types of crops and fertilizers used in fields adjacent to the farmer's land, the weather (e.g. precipitation, barometric pressure profiles, wind speed profiles, air temperature profiles, the amount of sunshine, the air quality and the like), the amount of local noise (e.g. car traffic, air traffic, construction), the time of year, and the like. Using such broad ranges of data and machine learning algorithms, using embodiments of the present invention, it is expected that the farmer will be provided with health insights to animals that the farmer cannot determine themselves.

The block diagrams of the architecture and flow charts are grouped for ease of understanding. However, it should be understood that combinations of blocks, additions of new blocks, re-arrangement of blocks, and the like are contemplated in alternative embodiments of the present invention. The specification and drawings are, accordingly, to be regarded in an illustrative rather than a restrictive sense. It will, however, be evident that various modifications and changes may be made thereunto without departing from the broader spirit and scope of the invention as set forth in the claims.

We claim:

1. A biometric monitoring device for an ear of an animal comprises:
    a male portion configured to be disposed on a first side of the ear comprising:
    a first housing having an upper surface configured to be disposed towards the first side of the ear;
    a plurality of protrusions disposed upon the upper surface of the first housing, wherein upper portions of the plurality of protrusions are configured to be disposed through the ear from the first side of the ear to a second side of the ear, wherein the plurality of protrusions includes at least a first protrusion and a second protrusion, wherein the first protrusion is longer than the second protrusion, wherein the first protrusion is characterized by a first diameter, and wherein the second protrusion is characterized by a second diameter thinner than the first diameter;

a plurality of electronic components disposed within the first housing, including a battery, a processor, and a temperature sensor; and a thermally conductive ring disposed upon on the upper surface of the first housing, wherein the thermally conductive ring is configured to be disposed against the first side of the ear and wherein the thermally conductive ring is thermally coupled to the temperature sensor; and a female portion configured to be disposed on the second side of the ear and coupled to the male portion comprising:

a second housing having a lower surface configured to be disposed against the second side of the ear;

a plurality of internal openings in the lower surface of the second housing, wherein the internal openings are configured to receive the upper portions of the plurality of protrusions, wherein the internal openings comprise at least a first opening and a second opening;

a retention portion disposed within the second housing, wherein the retention portion is configured to releasably retain an upper portion of the first protrusion when the first protrusion is disposed through the first opening, wherein the male portion is secured relatively to the female portion when the retention portion retains the upper portion of the first protrusion; and a chamber portion disposed with the second housing, wherein the chamber portion is configured to receive an upper portion of the second protrusion when the upper portion of the second protrusion is disposed through the second opening, wherein the chamber portion is configured to inhibit the female portion from being rotated relative to the male portion when the upper portion of the second protrusion is disposed through the second opening.

2. The device of claim 1
wherein the temperature sensor is characterized by an electronic characteristic in response to a temperature of the temperature sensor;
wherein the electronic characteristic is selected from a group consisting of: an electronic resistance, a voltage.

3. The device of claim 1 wherein the first housing comprises a material selected from a group consisting of: plastic, metal, silicone.

4. The device of claim 1
wherein the first housing comprises a portion having an opened configuration and a closed configuration; and
wherein the portion is configured to allow replacement of the battery when in the opened configuration; and
wherein the portion is configured to inhibit water from entering the male portion when in the closed configuration.

5. The device of claim 1
wherein the upper portion of the first protrusion includes at least one concave portion; and
wherein the retention portion comprises at least a member configured to engage the one concave portion of the first protrusion; and
wherein the male portion is secured relatively to the female portion when the retention portion engages the one concave portion of the first protrusion.

6. The device of claim 1
wherein a first diameter of the first protrusion is within a range of 0.5 to 2 mm; and
wherein a second diameter of the second protrusion is less than the first diameter.

7. The device of claim 1
wherein a first length of the first protrusion is within a range of 10 to 30 mm; and
wherein a second length of the second protrusion is less than the first length.

8. The device of claim 1
wherein the first protrusion and the second protrusion are laterally separated on the upper surface of the first housing within a range of 10 to 30 mm.

9. The device of claim 1 wherein the plurality of electronic components further includes an electronic component selected from a group consisting of: an accelerometer, a gyroscope, a humidity sensor, IR sensor, a magnetometer, heart rate sensor, ECG, PPG and a pressure sensor.

10. The device of claim 1 wherein a material for the thermally conductive ring is selected from a group consisting of: silver or silver alloy, copper or copper alloy, aluminum compound, gold, diamond, silicon nitride, silicon carbide, graphite, and graphene.

11. A monitoring device for an ear of an animal comprises: a first portion configured to be disposed on a first side of the ear of the animal comprising:

a first housing having an upper surface configured to be disposed towards the first side of the ear;

a first protrusion extending through the upper surface comprising a first upper portion configured to be disposed through the ear from the first side to a second side of the ear, wherein the first protrusion has a first maximum thickness within a range of 0.25 to 3 mm;

a second protrusion extending through the upper surface comprising a second upper portion configured to be disposed through the ear from the first side to the second side, wherein the second protrusion is characterized by a second maximum thickness less than the first maximum thickness; and a second portion configured to be disposed on the second side of the ear and configured to removably coupled to the first portion through the ear, wherein the second portion comprising:

a second housing comprising a bottom surface configured to be disposed towards the second side of the ear, wherein the second housing comprises a first internal opening configured to receive the first upper portion of the first protrusion, and a second internal opening configured to receive the second upper portion of the second protrusion;

a plurality of electronic components disposed within the second housing, including a battery, a processor, and a temperature sensor;

a thermally conductive ring disposed on the bottom surface of the second housing, wherein the thermally conductive ring is configured to be disposed against the second side of the ear, wherein the thermally conductive ring is thermally coupled to the temperature sensor;

a retention portion disposed within the second portion, wherein the retention portion is configured to retain the first upper portion of the first protrusion;

wherein the second internal opening is configured to inhibit the first housing to be rotated relative to the second portion when the second upper portion of the second protrusion is disposed with the second internal opening; and wherein the second housing comprises a first portion including the upper surface and a second portion;

wherein the first portion and the second portion are configured to be disposed within an open physical configuration and a closed physical configuration;

wherein when the first portion and the second portion are disposed within the open physical configuration, the battery is physically accessible; and wherein when the first portion and the second portion are disposed within the closed physical configuration, the battery is physically inaccessible.

12. The device of claim 11
wherein the temperature sensor is characterized by an electronic characteristic in response to a temperature of the temperature sensor;
wherein the electronic characteristic is selected from a group consisting of: an electronic resistance, a voltage.

13. The device of claim 11 wherein the second housing comprises a material selected from a group consisting of: plastic, metal, silicone.

14. The device of claim 11 wherein the second portion is configured to be screwed into the first portion to form the closed physical configuration.

15. The device of claim 11
wherein the upper portion of the first protrusion includes at least one concave portion; and
wherein the retention portion comprises at least a member configured to engage the one concave portion of the first protrusion; and
wherein the male portion is secured relatively to the female portion when the retention portion engages the one concave portion of the first protrusion.

16. The device of claim 11
wherein a first length of the first protrusion is within a range of 10 to 30 mm; and
wherein a second length of the second protrusion is less than the first length.

17. The device of claim 11
wherein the first portion comprises a third protrusion extending through the upper surface comprising a third upper portion configured to be disposed through the ear from the first side to the second side, wherein the third protrusion is characterized by a third maximum thickness less than the first maximum thickness; and
wherein the second housing also comprises a third internal opening configured to receive the third upper portion of the third protrusion; and
wherein the third internal opening is configured to inhibit the first housing to be rotated relative to the second portion when the third upper portion of the third protrusion is disposed with the third internal opening.

18. The device of claim 11
wherein the second protrusion and the third protrusion are laterally separated on the upper surface of the first housing within a range of 10 to 20 mm.

19. The device of claim 11 wherein the plurality of electronic components further includes an electronic component selected from the group consisting of: an accelerometer, a gyroscope, a humidity sensor, IR sensor, a magnetometer, heart rate sensor, ECG, PPG and a pressure sensor.

20. The device of claim 11 wherein a material for the thermally conductive ring is selected from a group consisting of: silver or silver alloy, copper or copper alloy, aluminum compound, gold, diamond, silicon nitride, silicon carbide, graphite, and graphene.

* * * * *